Nov. 30, 1965  KYO HASHIMOTO  3,221,321
COMBINED TEMPERATURE AND SHOCK RECORDING APPARATUS
Filed May 11, 1962  2 Sheets-Sheet 1

INVENTOR.
Kyo Hashimoto
BY
Roger B. Webster
ATTY.

United States Patent Office 3,221,321
Patented Nov. 30, 1965

3,221,321
COMBINED TEMPERATURE AND SHOCK
RECORDING APPARATUS
Kyo Hashimoto, 193 Kami-Ishihara, Chofu, Tokyo, Japan
Filed May 11, 1962, Ser. No. 194,050
1 Claim. (Cl. 340—261)

This invention relates to recording instruments and more particularly to combined temperature and shock recording apparatus for use on or in railway cars and other conveyances.

In transporting fresh fruits or other produce or frozen foods by refrigerator cars, it is highly desirable to obtain records of temperature changes or conditions in the refrigerator cars in which the cargoes are placed, as well as mechanical shocks which the cars are subject to and which might damage the cargoes.

It is an object of the present invention to provide a combined temperature and shock recording apparatus in a compact unitary form which is portable and can readily and removably be mounted on a wall of the refrigerator car.

Another object of the present invention is to provide a recording thermometer simple in construction and reliable in operation adapted for use in the combined temperature and shock recording apparatus as above specified.

A further object of the present invention is to provide a shock sensing device suitable for use in the combined temperature and shock recording apparatus as above specified, which may readily be adjusted for predetermined values of frequent shocks, and is responsive to different values of such shocks in a selective manner.

There are other objects and particularities of the present invention, which will be made obvious from the following descriptions with reference to the accompanying drawings, in which.

Figure 1:
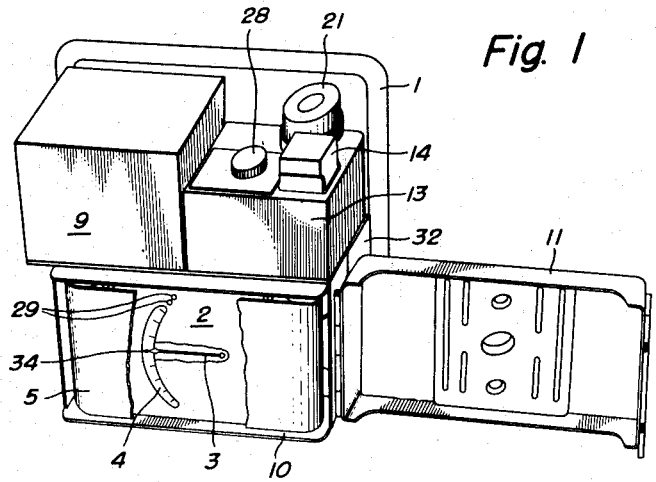
FIG. 1 is a general perspective view of a combined temperature and shock recording apparatus embodying the present invention, partly broken away.

Referring to the drawings, the recording apparatus embodying the present invention comprises a base plate 1 which is adapted to be mounted detachably on a car wall, not shown, by suitable means, known per se. The base plate carries a temperature meter 2 which may comprise a known electric indicating meter responsive to potential differences applied thereacross and representing the temperature values of the car room in which the meter is placed. The temperature meter includes an usual pointer needle 3 and a temperature scale 4 for cooperation with the pointer needle.

In close proximity and parallel to the front face of the temperature meter 2 is disposed a light sensitive film 5 which is unwound and fed from an usual roll 6 and taken up by a take-up shaft 7. The take-up shaft 7 is driven at a constant speed by a clock mechanism 8 enclosed in a housing 9. The temperature meter and film assembly is enclosed in a case 10 provided with a swing cover 11 hinged to an end wall of the case 10 which in turn is secured to the base plate 1.

The recording apparatus further comprises a shock sensing device 12 enclosed in another housing 13 secured to the base plate 1. The housing 13 is provided with an opening which is hermetically closed by a protrudent case 14. The case 14 holds therewithin a quantity of silica gel and is communicated with the inside of the housing 13. Thus, the inner chamber of the housing 13 is always kept in a sufficiently dry condition. Also in the housing 13 there are disposed various resistors and other electrical elements to be described.

The temperature meter 2 comprises four resistors R1, R2, R3 and R4 forming the four legs of a Wheatstone bridge, which is completed by the energizing coil 15 of the electric indicating meter forming part of the temperature meter 2. One leg R4 of the Wheatstone bridge is connected in shunt with a thermistor 16, known per se, and the resistor R4 and the thermistor 16 may selectively be connected in the Wheatstone bridge circuit by means of a change over switch 17 which is provided with a handle, not shown, operable from outside. The handle may protrude behind the base plate 1, and consequently, after the apparatus has been mounted on a wall, the switch 17 cannot be operated.

Figure 3:
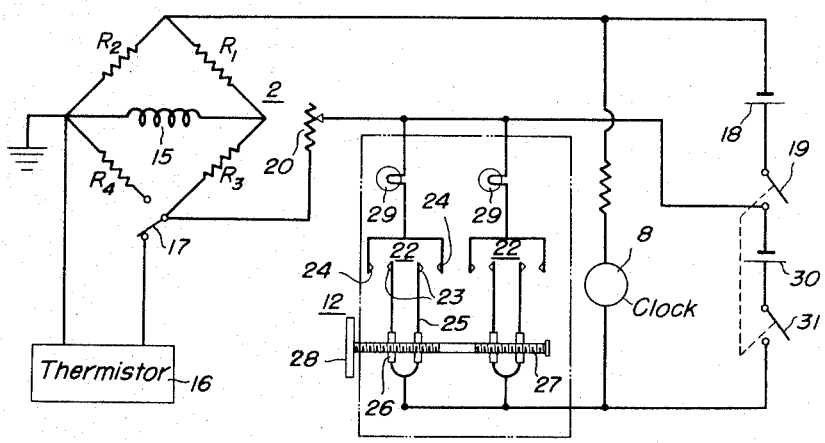
FIG. 3 is a circuit diagram of all the electrical elements contained in the apparatus shown in FIG. 1.

The Wheatstone bridge is energized from a dry cell 18 through a switch 19 and an adjustable resistor 20. The thermistor 16 is mounted detachably in the housing 13. For this purpose, a thermistor probe 21 is employed which is plugged into a corresponding jack provided in the housing wall. When the probe 21 is plugged into the jack, the thermistor element thereof is connected in the Wheatstone bridge circuit as shown in FIG. 3.

The housing 13 further encloses the shock sensing device 12. The device 12 comprises a plurality, two for example, of shock sensing units 22. Each shock sensing unit 22 is consisted of a pair of movable contacts 23 facing in opposite directions and a pair of cooperating stationary contacts 24. Each movable contact 23 is fixed to the top free end of a vertical leaf spring 25 which is secured at the lower end to a rigid holder 26. All of the rigid holders 26 are provided with screw-threaded holes, respectively, and a screw-threaded bar 27 passes through all of the holes, and makes screw-thread engagement with all of the spring holders 26. A pair of holders 26 for each pair of leaf springs 25 forming each unit 22 have their holes screw-threaded in opposite directions. Consequently, when the bar 27 is rotated in one direction, the pair of holders 26 of each shock sensing unit 22 move towards each other, while when the bar 27 is rotated in the opposite direction, the pair of holders 26 move away from each other. Thus, the normal distance in each unit 22 of each movable contact 23 from the cooperating stationary contact 24 may be varied or adjusted by rotation of the screw bar 27. The bar 27 is provided with an operating knob 28 which is operable from outside the casing 13. The two shock sensing units 22 may be so designed that one responds to a certain degree of mechanical shock in the directions parallel to the screw bar 27, while the other responds to 3/2 degree of the former in the same direction, to close the respective movable contacts 23 to the cooperating fixed contact 24, respectively. Thus, for example, if one shock sensing unit 22 is set to close its contacts when subjected to mechanical shocks of 2 G, then the other unit 22 is set to close its contacts when subjected to a mechanical shock of 3 G.

The shock sensing units 22 respectively control energization of electric lamps 29 from a dry cell 30 through a switch 31. The switches 19 and 31 are mechanically interconnected with each other as shown by dotted lines, and one handle operation can open or close these switches simultaneously. The dry cells, the switches and some of resistors may be enclosed in a suitable separate case 32 which is conveniently disposed between the case 10 and the base plate 1, and the operating handle, not shown, of switches 19 and 31 projects beyond the lateral wall of the case 32.

The clock 8 is shown as an electric clock and energized by the dry cells 18 and 30 in series.

When the switches 19 and 31 are closed, the clock 8 is operated to drive the take-up shaft 7 of the film 5. In the Wheatstone bridge, the switch 17 is at first operated to connect the resistor R4 in circuit, and the variable resistor 20 is adjusted to bring the pointer needle 3 to zero position. For this purpose, the resistor 20 is provided with an adjusting knob, not shown, operable from outside the housing 32. After the zero adjustment has been completed, the switch 17 is operated to disconnect the resistor R4 and to connect the thermistor 16 in the Wheatstone circuit. The thermistor 16 changes its resistance value depending upon the ambient temperature as is well known, and the pointer needle 3 deflects to represent the temperature value.

When the car carrying the recording apparatus is subjected to a mechanical shock in the direction of car travel which is parallel to the screw bar 27, in the range between 2 G and 3 G, for example, one shock sensing unit 22 closes its contacts 23–24 to energize the corresponding lamp 29. When the shock is larger than 3 G, the other unit 22 also closes its contacts 23–24 to energize the corresponding lamp 29 also, thus both lamps 29 being energized. The lamps 29 are disposed in proximity to the light sensitive film 5 to irradiate the same. The two lamps 29 are displaced in position from each other with respect to the film, and record images at different positions on the light sensitive film 5 show different ranges of mechanical shocks.

According to the present invention, the pointer needle 3 of the temperature meter 2 is provided at the tip with a minute spot 34 of radiation material, known per se, which essentially radiates light or equivalent radiation which acts on the photographic film to form a corresponding image thereon. Thus, when the film 5 travels in proximity to the needle point 34, an image line 35 is produced on the film, which may be developed later to provide a record of temperature changes. Records of mechanical shocks 36 which the apparatus has been subjected to are also produced in accordance with lighting and extinguishment of the lamps 29.

Figure 2:
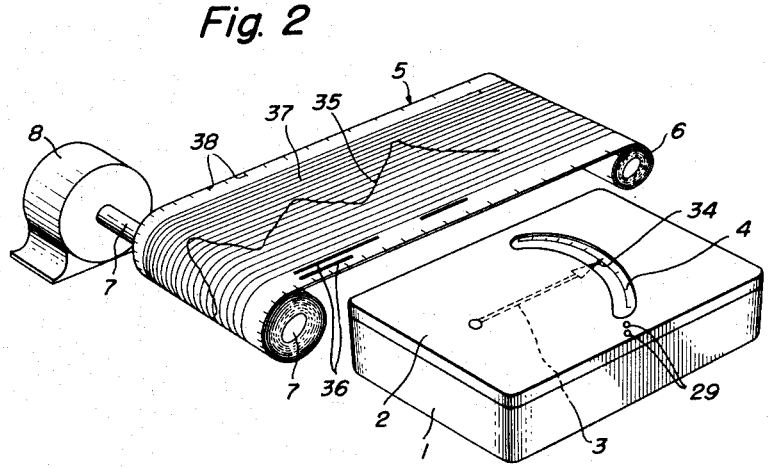
FIG. 2 is a perspective view diagrammatically showing the relative arrangement of the recording film and the temperature meter as well as the shock indicators.

In order to facilitate investigation of the records developed on the film 5, the film 5 may specially be made with permanent and opaque temperature scale lines 37 and time marks 38 as shown in FIG. 2. Since the linear speed of film 5 increases with the decrease in diameter of the film roll 6, intervals between successive time marks 38 should be increased for representing a definite time unit.

Scale lines 37 and time marks 38 on the film are not necessary, because a separate transparent scale having similar temperature scale lines and time marks may be used superposed on the film having developed records. The whole assembly is usually enclosed in a casing, not shown, secured to the base plate 1 with usual sealing means.

What is claimed is:

A shock sensing device for use in a temperature and shock recording apparatus, said device comprising at least a pair of opposite stationary contacts, a pair of movable contacts disposed between said pair of stationary contacts for cooperation therewith, respectively, a pair of parallel resilient strips respectively carrying said pair of movable contacts and normally keeping them away from said stationary contacts, means for adjusting the normal distances of said respective movable contacts toward and away from each other and from the corresponding ones of stationary contacts, said resilient strips responding to mechanical shocks of predetermined directions and above a predetermined magnitude to bring said movable contacts into engagement with the corresponding stationary contacts, and an electric lamp connected in circuit with said electric contacts.

References Cited by the Examiner

UNITED STATES PATENTS

| | | | |
|---|---|---|---|
| 1,397,525 | 11/1921 | Kennedy | 73—71.2 |
| 1,416,550 | 5/1922 | Frank | 73—70.2 |
| 1,590,452 | 6/1926 | Sparkes. | |
| 1,787,940 | 1/1931 | Garbutt | 346—108 |
| 2,325,451 | 7/1943 | Wait | 346—49 |
| 2,649,715 | 8/1953 | Gobel | 73—362 |
| 2,673,136 | 3/1954 | Stein et al. | 346—45 |
| 2,684,473 | 7/1954 | Shannon | 73—362 X |
| 2,784,050 | 3/1957 | Geiser | 346—49 |
| 2,834,247 | 5/1958 | Pickels | 346—49 |
| 2,872,495 | 1/1959 | Burgess | 200—61.49 |
| 2,906,117 | 9/1959 | Kennard | 73—70.2 |
| 2,938,385 | 5/1960 | Mack | 73—367 |

OTHER REFERENCES

Publication: A. W. Melville, A High Stability Mums-Operated Recording Thermistor Thermometer. In Journal of Scientific Instruments, pp. 179–180, vol. 35, May 1958.

LOUIS R. PRINCE, *Primary Examiner.*

ISAAC LISANN, *Examiner.*